(12) United States Patent
Nienhaus (10) Patent No.: US 6,632,123 B1
(45) Date of Patent: Oct. 14, 2003

(54) GRINDING OF CUTTING TOOLS WITH WAVY CUTTING EDGES

(75) Inventor: Wilhelm Gerhard Nienhaus, Ferntree Gully (AU)

(73) Assignee: Anca Pty LTD, Bayswater North (AU)

( * ) Notice: Subject to any disclaimer, the term of this patent is extended or adjusted under 35 U.S.C. 154(b) by 0 days.

(21) Appl. No.: 09/786,411

(22) PCT Filed: Sep. 1, 1999

(86) PCT No.: PCT/AU99/00712

§ 371 (c)(1),
(2), (4) Date: Mar. 2, 2001

(87) PCT Pub. No.: WO00/13848

PCT Pub. Date: Mar. 16, 2000

(30) Foreign Application Priority Data

Sep. 3, 1998 (AU) .............................................. PP5691

(51) Int. Cl.[7] ............................................. B24B 49/00
(52) U.S. Cl. ............................................. 451/5; 451/48
(58) Field of Search .............................. 451/5, 48, 141, 451/217, 220, 58; 408/57, 56, 59, 223, 229, 230

(56) References Cited

U.S. PATENT DOCUMENTS

| | | | |
|---|---|---|---|
| 2,322,894 A | * | 6/1943 | Stevens ...................... 408/230 |
| 4,215,955 A | | 8/1980 | Lillie |
| 4,453,221 A | | 6/1984 | Davis et al. |
| 4,472,093 A | | 9/1984 | Hamilton |
| 4,538,233 A | | 8/1985 | Resnick et al. |
| 4,560,308 A | | 12/1985 | Deller |
| 4,764,059 A | | 8/1988 | Wale |
| 5,586,843 A | | 12/1996 | Minicozzi |
| 6,030,155 A | * | 2/2000 | Scheer et al. ................. 408/59 |

FOREIGN PATENT DOCUMENTS

EP    098 970    1/1984

OTHER PUBLICATIONS

Derwent Abstract Accession No. 94–014265/01, SU 1757792 A Aug. 30, 1992 Abstract.
Derwent Abstract Accession No. H7728 K/23, SU 948547 Abstract.

* cited by examiner

Primary Examiner—Robert A. Rose
(74) Attorney, Agent, or Firm—Andrus, Sceales, Starke & Sawall, LLP (57) ABSTRACT

A CNC tool grinding machine has at least one rotatable grinding wheel (1) movable relative to a workpiece (2) for grinding a flute surface (3) of a blade in the workpiece (2). The machine is programmed with a path for the grinding wheel (1) calculated to grind a smooth cutting edge (5) for the blade, and programmed with perturbations to the path which vary the movement of the grinding wheel (1) to grind a wavy cutting edge (6) in the workpiece. With such a machine, it is possible to grind all surfaces of a wavy cutting edge in a single set up rather than requiring two more grinding and milling operations to form the wavy cutting edge.

56 Claims, 6 Drawing Sheets

GRINDING OF CUTTING TOOLS WITH WAVY CUTTING EDGES

CROSS REFERENCE TO RELATED APPLICATION

The present application is the U.S. national stage application of International Application PCT/AU99/00712, filed Sep. 1, 1999, which international application was published on Mar. 16, 2000 as International Publication WO 00/13848 in the English language. The International Application claims the priority of Australian Patent Application PP5691, filed Sep. 3, 1998.

BACKGROUND OF THE INVENTION

This invention relates to the grinding of cutting tools, and is particularly, but not exclusively, concerned with a method of operating a computer numerically controlled (CNC) grinding machine to product cutting tools with wavy cutting edges, and to such cutting tools produced by the method.

Rotary cutting tools generally have a series of helical blades. These blades are generally formed by two adjoining faces, a leading face (e.g. a flute surface) and a trailing face (e.g. a relief surface). The adjoining faces in turn form a crest with a sharp edge of generally smooth helical configuration. This edge is usually called the cutting edge. A particular type of milling cutter has helical blades with cutting edges of a wavy or sinusoidal configuration. Such a cutting edge configuration facilitates removal of material from a workpiece in small metal chips rather than in long lengths of swarf. Accordingly, cutting tools with a wavy cutting edge configuration are often referred to as "roughcut" tools.

Roughcut tools usually have their blades formed of high speed steel or tungsten carbide. However, various problems have previously been experienced in the manufacture of such milling cutters with wavy cutting edges.

CNC grinding machines can be used to grind helical flutes and relief faces in a high speed steel workpiece to form the helical cutting edges. However, grinding wheels of CNC machines are usually of greater diameter than the width of the flutes, and this has hitherto precluded the exclusive use of grinding wheels to grind a complete milling cutter blade with cutting edges of wavy or sinusoidal configuration in a single setup from a solid blank. Thus, a separate setup on different machines is usually required to perform the machining operations necessary to generate the flute and relief surfaces of such blades. For instance, the relief surfaces are often ground on a mechanically controlled re-sharpening machine, while the wavy portion of the flute surface is machined on a milling machine by using a ball nose mill of smaller diameter than the width of the flutes between the helical leading and trailing edges. Such ball nose mills are not, however, suitable for tungsten carbide. When it is desired to have a blade, featuring such a cutting edge, formed of tungsten carbide, this is usually achieved by incorporating a tungsten carbide insert with the required wavy cutting edge into a tool formed of another material, but such a tool can be expensive to manufacture.

It is therefore desirable to provide an improved method of producing a cutting tool with wavy cutting edges using a CNC tool grinding machine.

SUMMARY OF THE INVENTION

According to one aspect of the invention, there is provided a method of operating a CNC grinding machine to grind a blade with a cutting edge of wavy configuration in a workpiece, the tool grinding machine having at least one rotatable grinding wheel movable relative to the workpiece, said method including:

programming the CNC machine with at least one path for the at least one grinding wheel, the at least one path being calculated to grind at least one surface of a blade with a generally smooth cutting edge in the workpiece;

programming the CNC machine with perturbations to said at least one path, the perturbations varying the movement of that least one grinding wheel in such a manner that the at least one grinding wheel is arranged to grind at least one surface of the blade with a cutting edge of a wavy configuration in the workpiece.

According to another aspect of the invention, there is provided a CNC grinding machine having at least one rotatable grinding wheel movable relative to a workpiece for grinding at least one blade in the workpiece, the machine being programmed with at least one path for the at least one grinding wheel which is calculated to grind at least one surface of a blade with a generally smooth cutting edge, wherein the machine is programmed with perturbations to said at least one path, the perturbations varying the movement of the at least one grinding wheel from said at least one path in such a manner that the at least one grinding wheel grinds a blade with a cutting edge of wavy configuration in the workpiece.

According to a further aspect of the invention, there is provided a computer program, wherein the set of wheel positions defining said path is generated from data representing geometry for the blade with a generally smooth cutting edge and data representing the shape of said at least one grinding wheel, and the path adjustment means calculates the perturbed wheel positions from the set of wheel positions defining said path and from data representing the perturbations for the wavy cutting edge.

Preferably, the computer program is recorded on a memory or data storage medium, such as a floppy disc, CD-ROM or the like, which may be supplied to a person having a programmable CNC tool grinding machine. It is, however, contemplated that the computer program could be downloaded by such a person over a computer network, such as the Internet.

The CNC machine preferably has a programmable control unit (PCU) into which data representing the geometry for the blade with a generally smooth cutting edge and the shape of the grinding wheel is entered, together with data representing the required perturbations for the wavy cutting edge.

The CNC machine may have a plurality of grinding wheels, in which case the machine is programmed with a plurality of paths for the grinding wheels for grinding the surfaces of the blade with the generally smooth cutting edge, and the machine is programmed with perturbations to said paths.

Each programmed path which is calculated to grind at least one of the surfaces of a blade with a generally smooth cutting edge is defined by a set of wheel positions for the at least one grinding wheel. Preferably, the CNC machine includes a wheel position generator for calculating the set of wheel positions defining the programmed path for grinding the generally smooth cutting edge, and a wheel position adjustment means for calculating perturbed wheel positions for the grinding wheel which are offset from said programmed path. Preferably, the wheel positions are offset in a linear or rotary direction, or combinations thereof, by definition of specific functions for offset magnitudes in said direction or directions such that, for each perturbed position, the grinding wheel contacts the workpiece at a single location of the perturbed cutting edge, or, for second or further relief facets, the perturbed leading edge of the relief facet, while avoiding overcutting or undercutting of the edge.

The leading edges of relief facets may also be represented by parametric curves with the path offset method above being applied in similar manner for grinding the relief facets with wavy leading edges.

In a particularly preferred embodiment, overcutting or undercutting is avoided for each perturbed grinding wheel position, by calculating the magnitude of any distance between the grinding wheel and the cutting edge in an overcut or undercut position, determining whether said magnitude is less than a threshold value and, if not, revising the perturbed wheel position directly or incrementally until it is less than said threshold value.

According to a further aspect of the invention, there is provided a cutting tool having at least one blade with a wavy cutting edge produced by the method or by a CNC machine or computer program in accordance with one of the preceding aspects of the invention.

Whilst the present invention is particularly applicable to grinding blades with wavy cutting edges in a cylindrical, cutting tool, it will be appreciated that it may be applied to grind such blades in cutting tools of other shapes, such as conical or toroidal shaped cutting tools or irregular shaped tools having a central longitudinal axis of rotational symmetry.

As used herein, the term wavy is used to refer to any perturbations having the general shape of a wave or serpentine. It includes within its scope symmetrical sinusoidal perturbations, piece-wise or asymmetrical sinusoidal perturbations, part circular scallops in a cutting edge and free-form wavy perturbations.

According to a particular preferred embodiment of the invention there is provided a cutting tool having a wavy cutting edge wherein the wavy cutting edge includes asymmetric or piece-wise sinusoidal perturbations to a generally smooth helical cutting edge, preferably, with alternate perturbations having different wavelengths.

BRIEF DESCRIPTION OF THE SEVERAL VIEWS OF THE DRAWING

A preferred embodiment of the present invention will now be described, by way of example only, with reference to the accompanying drawings, in which.

DETAILED DESCRIPTION OF THE INVENTION

Figure 1:
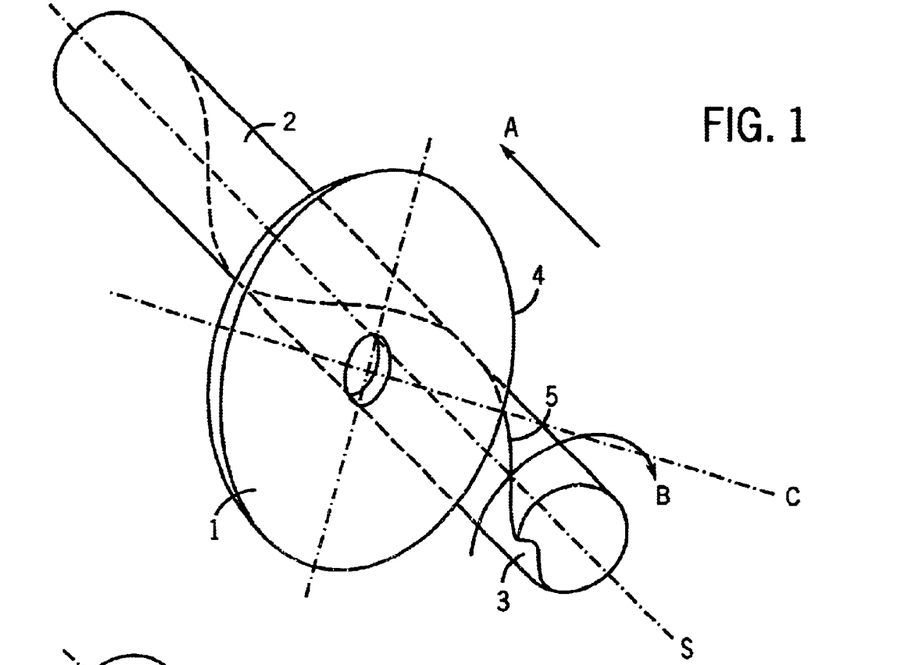
FIG. 1 is a schematic perspective view of a grinding wheel of a CNC tool and cutter grinding machine operating on a workpiece to grind the flute surface of a blade with a smooth cutting edge on the workpiece.

Referring to FIG. 1 there is shown a grinding wheel 1 of a CNC tool grinding machine operating on a cylindrical workpiece 2 rotatable about a central longitudinal axis of rotational symmetry S in order to grind a flute surface 3 of a blade with a smooth helical cutting edge. The grinding wheel 1 is substantially disc-shaped and is rotatable about a central axis of rotation C. The grinding wheel has a peripheral grinding edge 4.

The grinding wheel is movable in an axial direction A and a circumferential direction B relative to the workpiece 2 to grind the flute surface 3 of a blade which features a cutting edge 5. In a rotary cutting tool formed from the workpiece 2, the cutting tool usually has a plurality of helical blades, each featuring a flute surface 3 and each with a cutting edge 5 forming a leading edge of the tool.

Figure 3:
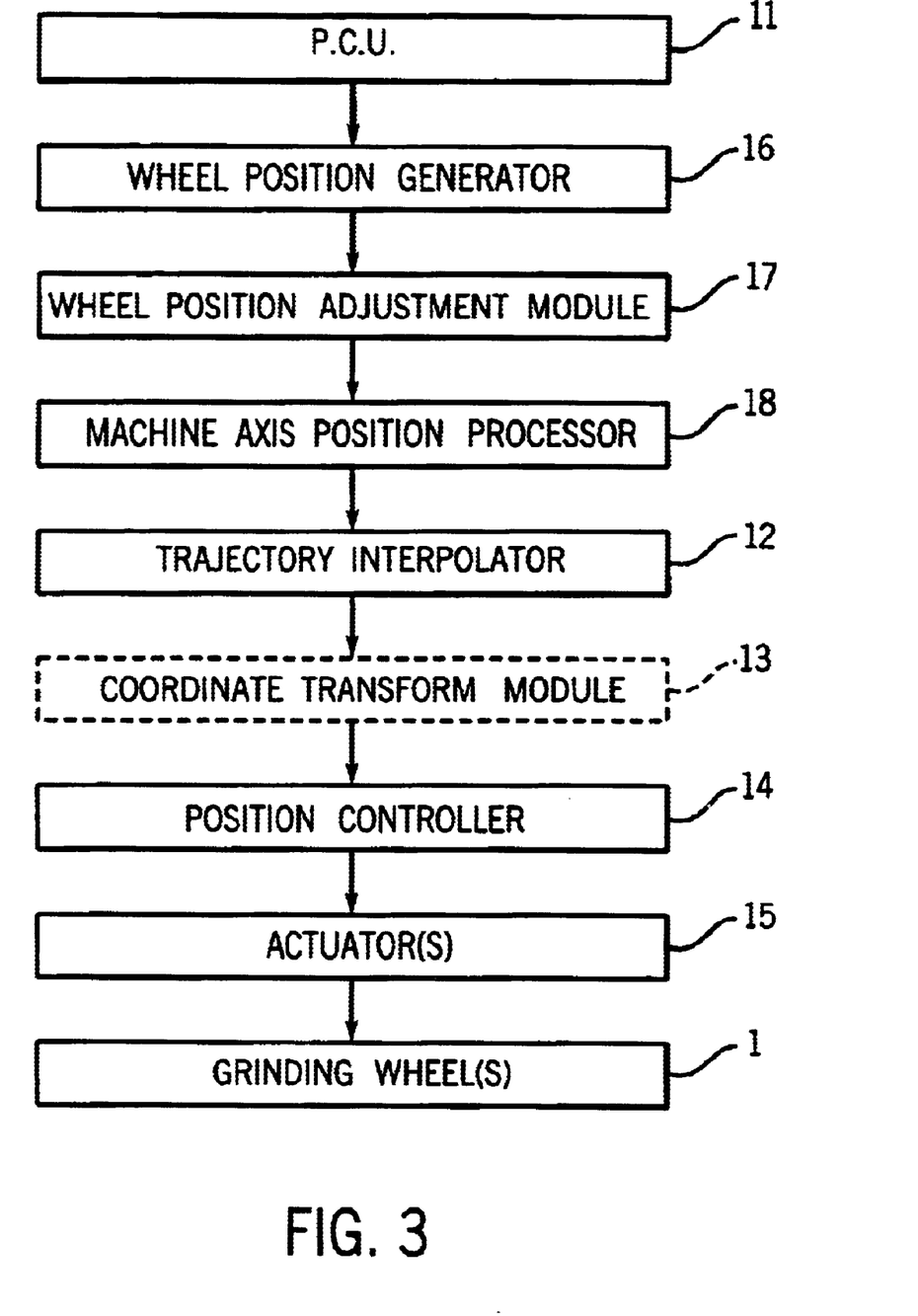
FIG. 3 is a schematic block diagram of the control system for a CNC tool and cutter grinding machine in accordance with the invention.

CNC tool grinding machines nowadays have five or more programmable axes which are used to program a path for the motion of the grinding wheel during its operation on the workpiece. The programmable axes may include physical axes and virtual programmable axes or "soft axes" such as disclosed in our Australian Patent No. 665000. In the particular case described with reference to FIG. 1 above, the movement of the grinding wheel in the axial direction A and in the circumferential direction B relative to the workpiece may be programmed in terms of the programmable axes of the CNC machine which are not shown in FIG. 1. A control system for a CNC tool grinding machine in accordance with the invention is shown in FIG. 3. As in a conventional CNC machine, the control system has a programmable control unit (PCU) 11, a trajectory interpolator 12, a position controller 14, and one or more actuators 15 for moving at least one grinding wheel 1 relative to a workpiece. If the CNC machine includes "soft axis" programming, it may also include a co-ordinate transform module 13.

The control system also includes a wheel position generator 16 for generating a set of wheel positions defining one or more tool paths for the at least one grinding wheel 1 from data entered into the PCU 11, and a machine axis position processor 18 for deriving a set of machine axis positions from the set of wheel positions. In the present invention, the control system of the CNC machine also includes a wheel position adjustment module 17 between the wheel position generator 16 and the machine axis position processor 18 for adjusting the set of wheel positions into a set of transformed wheel positions representing one or more tool paths for grinding along a perturbed cutting edge. The wheel position generator 16, the wheel position adjustment module 17 and the machine axis position processor 18 may comprise programs or modules incorporated within the programmable control unit (PCU) 11, or they may be separate programs or modules. The machine axis position processor 18 derives the set of machine axis positions which correspond to these transformed wheel positions. Then the CNC tool grinding machine is programmed with these machine axis positions through the standard CNC programming interface. The programmed path is then transformed into physical motion of the grinding wheel by the CNC tool grinding machine controlling the motion of the actuator(s) 15 by means of its trajectory interpolator 12, coordinate transform module 13 and position controller 14.

Conventional CNC tool grinding machines are usually capable of only grinding a blade with a smooth cutting edge 5 in a cutting tool as shown in FIG. 1. However, as discussed above, for particular types of milling cutters, it is desirable to have blades with a wavy or serpentine cutting edge which are adapted to remove material in small metal chips, rather than in long lengths of swarf. In order to form such blades, a workpiece with a smooth helical flute, formed by a grinding wheel, is usually subjected to a secondary operation in a separate setup involving the use of a ball nose mill on a milling machine to machine the flute surface of a blade with a wavy cutting edge and a tertiary operation in a further setup to grind the wavy relief surface of the blade with a wavy cutting edge on another grinding machine. In the present invention, however, it is possible to grind all surfaces of a blade with wavy cutting edge, i.e. the smooth helical flute surface, the wavy portion of the flute surface and the wavy relief surface, in a workpiece in a single setup and using one or more grinding wheels by suitable programming of the path or paths for movement of the grinding wheel or grinding wheels.

Figure 2:
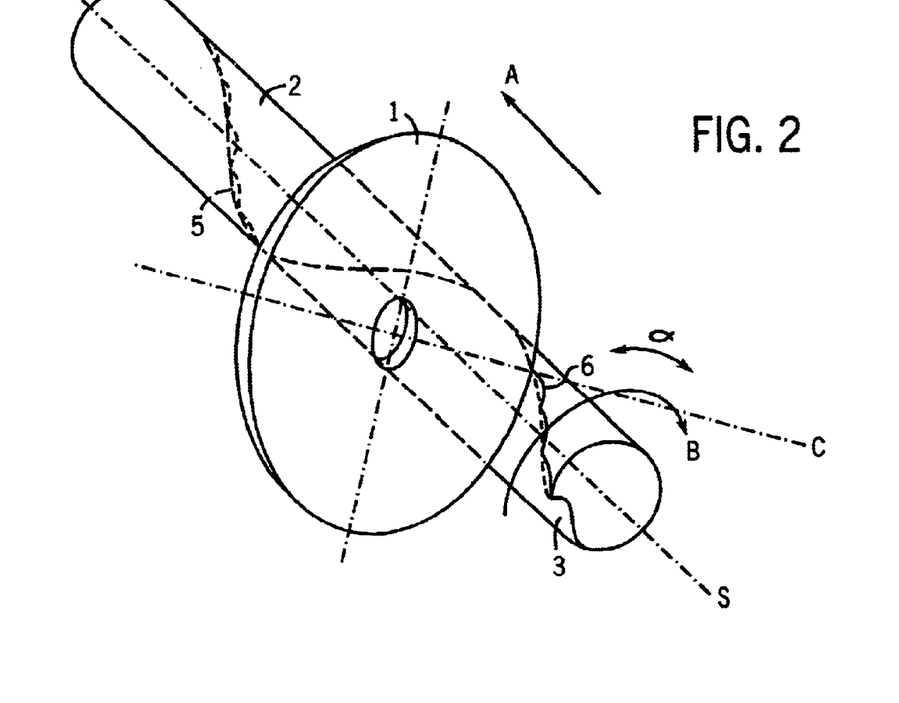
FIG. 2 is a schematic perspective view similar to FIG. 1 showing a grinding wheel programmed to grind the flute surface of a blade with a perturbed or wavy cutting edge in accordance with the invention.

Referring to FIG. 2, a grinding wheel 1 of a CNC machine is shown operating on a cylindrical workpiece 2 having a helical flute 3 to grind the wavy flute surface of a blade with, a wavy or serpentine cutting edge 6. In the present invention, this is achieved by deriving a path for the grinding wheel representing the motion of the grinding wheel would normally take to grind a smooth helical flute 5 on the workpiece 2 (as in FIG. 1), then deriving perturbations for, and applying the perturbations to, said path and programming the CNC machine with this perturbed path in order to from the wavy leading and trailing faces required to form a blade with a wavy cutting edge 6. In the example shown in FIG. 2, perturbations α are applied to the circumferential motion of the grinding wheel 1 relative to the workpiece 2 in the direction B.

One preferred method of programming a CNC grinding machine to grind a blade with a wavy cutting edge in a workpiece will now be described with particular reference to FIGS. 4, 5 and 6.

The process is performed in the following steps:

(1) A standard end mill geometry is specified, typically featuring a smooth helical cutting edge. Such an edge can mathematically be described as a parametric curve:

$$c\_1(t)=(x(t), y(t), z(t)),$$

where x(t), y(b) z(t) are co-ordinates defining the position of each point on the cutting edge Data representing this standard end mill geometry and the shape of the grinding wheel are programmed into the PCU 11 of the CNC machine (step 20 in FIG. 6) or into separate programs or modules.

Figure 6A:
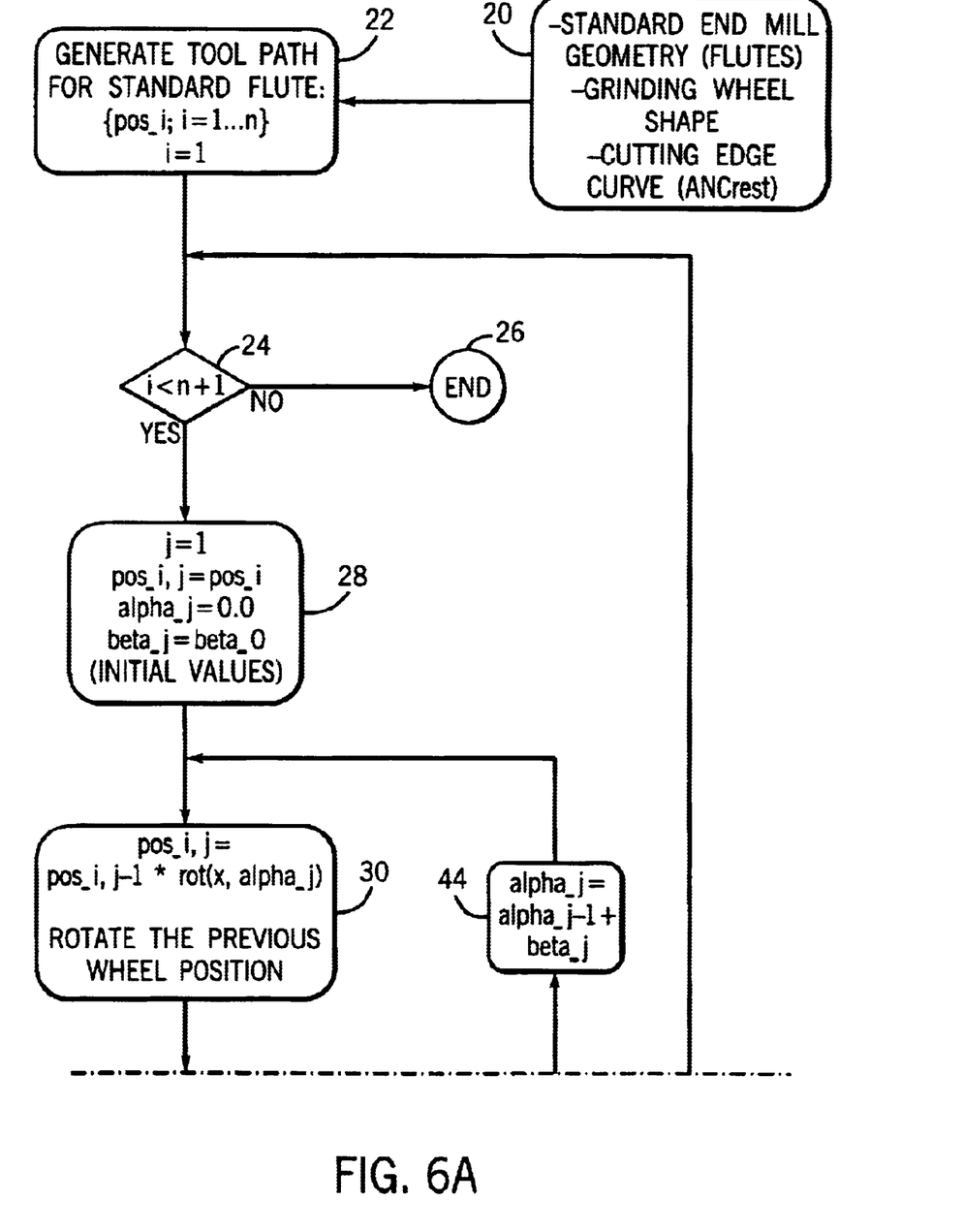
FIG. 6 is a schematic block diagram of a method of programming a CNC machine in accordance with the invention.
Figure 6B:
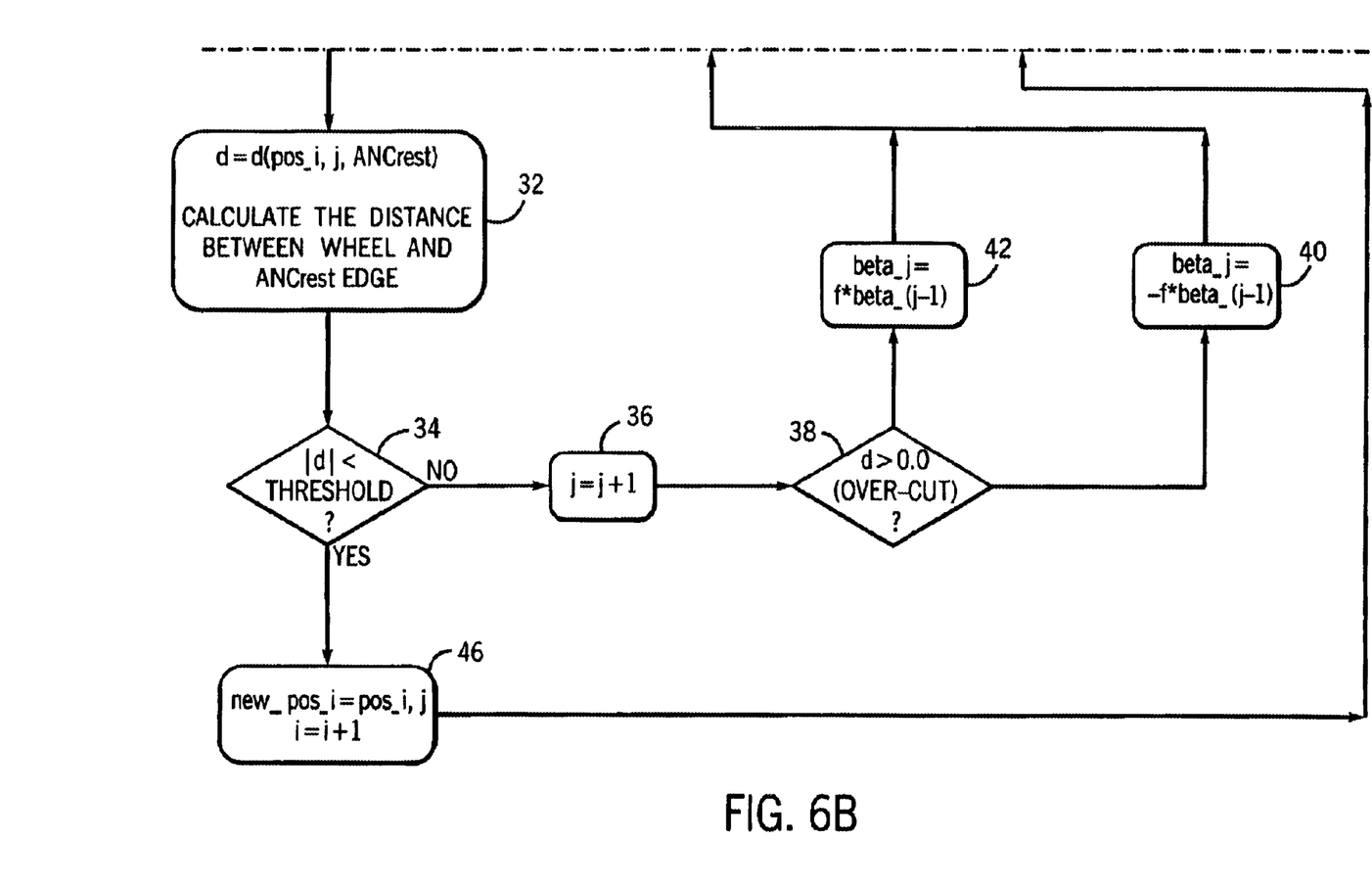

(2) With commonly known means, the tool-path for grinding the milling cutter flute along the smooth helical edge is generated in the wheel position generator 16 and stored as a set of "n" grinding wheel positions relative to the workpiece (step 22 in FIG. 6).

(3) Another edge c\_2 is specified as a perturbation on the previously specified smooth edge. Such an edge can also mathematically be described as a parametric curve:

$$c\_2(t)=(x(t)+p_x(t), y(t)+p_y(t), z(t)+p_z(t)=c\_1(t)+p(t),$$

Here $p_i(t)$ denotes the perturbation in the i-th coordinate, and p(t) the total perturbation. In the following the edge defined by c\_2(t) edge is referred to as the cutting edge. Data representing the cutting edge curve is also programmed into PCU 11 of the CNC machine (at 20 in FIG. 6) or separate programs or modules.

Due to the perturbation of the smooth edge, each of the grinding wheel positions as specified in (2) no longer presents a valid grinding wheel position. These grinding wheel positions, depending on the direction of the perturbation of the cutting edge, in general either leave a certain distance between the grinding wheel 1 and the cutting edge 6 (under-cut) or cause the wheel to cut into, hence destroying, the cutting edge (over-cut). Overcutting and undercutting are illustrated in FIGS. 4 and 5 respectively. In FIG. 4, the grinding edge 4 of the face of the grinding wheel 1 is shown cutting into the cutting edge 6 by a distance d. In FIG. 5, the grinding edge 4 of the face of the grinding wheel 1 is spaced from the cutting edge 6 by a distance -d.

(4) To each of the grinding wheel positions (i<n+1) (step 24 and 26 in FIG. 6), as found in (2), a transformation (step 30) is applied by the wheel position adjustment module 17, such that the distance (step 32) between the grinding wheel and the cutting edge or the maximum penetration of the grinding wheel into the cutting edge, respectively, becomes zero or falls below a predetermined threshold (step 34), resulting in a set of transformed wheel positions (new\_pos\_i) (step 46), which represent the accurate tool path for grinding along the perturbed cutting edge.

(5) The preferred transformation corresponds to offsetting the original wheel position in at least one linear or rotary direction, or combinations thereof, by the amounts determined through evaluating the specific functions for the offset magnitudes (alpha\_i) in said directions (step 30).

One such specific function is the following iterative procedure, as illustrated by example in steps 28–44 in FIG. 6.

(A) The process starts by initializing the step counter of the iterative adjustment procedure j to one (j=1), initializing the adjusted grinding wheel position (pos\_ij;j=1) with the wheel position (pos\_i) required to grid the smooth flute, initializing the perturbations(s) (alpha\_j) in linear and/or rotary directions to zero and the perturbation adjustment increment(s) (beta\_j) to their initial non-zero value (i.e., pha\_j=0.0 and beta\_i=beta$_0$) (step 28 in FIG. 6).

(B) Then, a new wheel position (pos\_i,j, i.e. the j-th adjustment of the i-th wheel position) is generated by offsetting the original wheel position in the offset directions by the amount specified by the current settings of the perturbations alpha\_j.

(C) For this offset position, the error, i.e. the minimum distance between or the maximum penetration of grinding wheel and cutting edge, is calculated (step 32). If the error falls below the predetermined threshold (step 34), the iteration procedure for the current wheel position ends, the offset grinding wheel position is added to the set of new wheel positions and i is incremented by one to continue the transformation procedure for the next wheel position (step 46).

(D) If the error is greater than the predetermined threshold, a further iteration step is required (j=j+1) (step 36) and it is checked whether there is overcut or undercut (step 38).

(E) If there is overcut, a negative perturbation adjustment increment for the next iteration step (j+1), beta\_j=-f* beta\_i−1 is calculated (step 40). If there is undercut, a positive perturbation adjustment increment beta\_i=f* bet\_i−1 is calculated (step 42).

(F) The perturbation(s) (alph\_i) are then modified by the perturbation adjustment increment for overcut or undercut (beta\_i), i.e. alpha\_j=alpha\_j−1+beta\_j (step 44 in FIG. 6).

(G) Then the next iteration step is started by generating a new wheel position (B) with the new current perturbation (alpha_i) (as calculated in F) which has less error (as calculated in C).

(H) Steps (B) to (G) are repeated until the threshold condition (step 34) holds and the iteration ends.

(5.a) One such offset direction is a rotation of the grinding wheel position about a rotation axis, which is specified relative to the milling cutter geometry. And one such specific function is the function, which determines the rotation angle about that axis.

Figure 4:
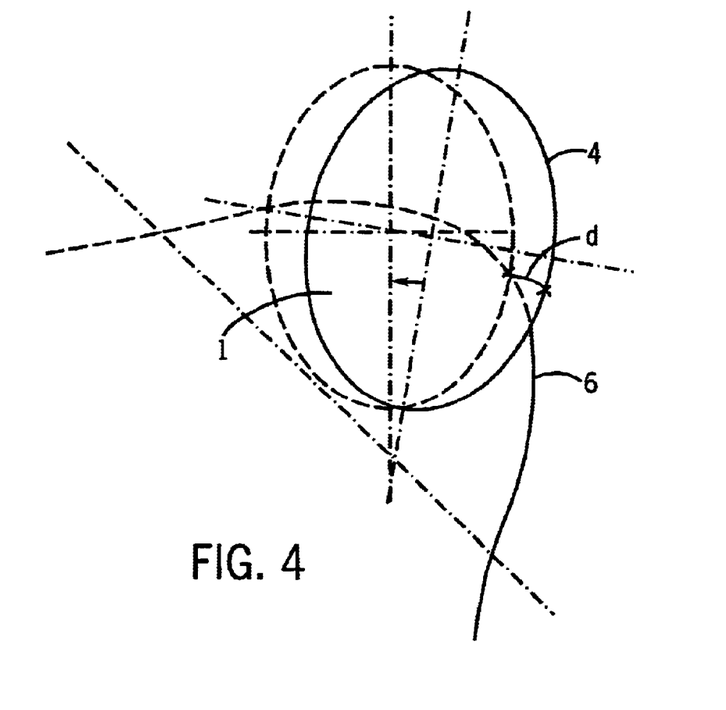
FIG. 4 is a schematic perspective view showing a grinding wheel avoiding overcutting of the cutting edge in the present invention.
Figure 5:
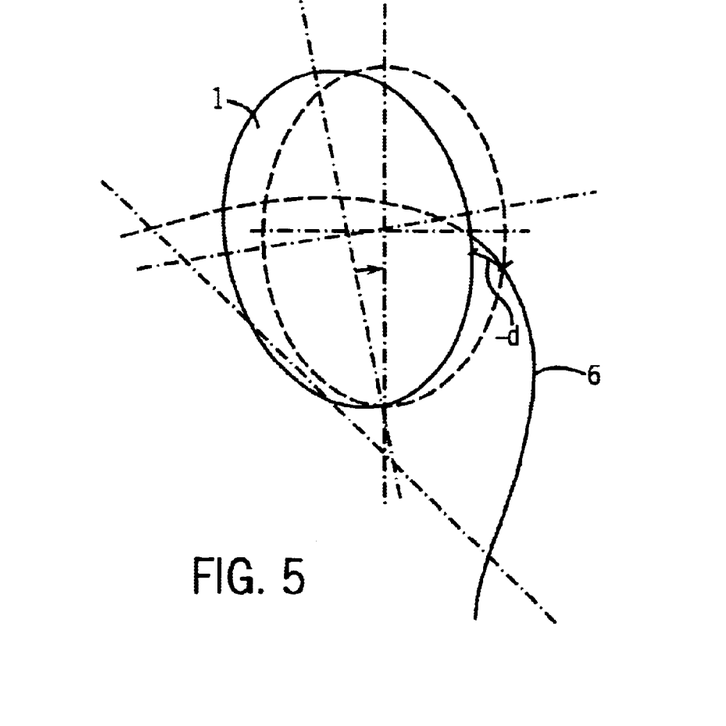
FIG. 5 is a schematic perspective view showing a grinding wheel avoiding undercutting in the present invention.

(5a.1) One such rotation direction is a rotation of the grinding wheel about the milling cutter axis (pos_i,j=pos_ i,j−1 * rot(x,alpha_j)) (step 30 in FIG. 6) such as illustrated in FIGS. 4 and 5. One such specific angle function is that angle function, which evaluates by an iterative procedure according to (A)–(F) to either the positive or negative value of a fraction of a previously determined angle, depending on whether an undercut or overcut was detected, respectively.

(5.a.2) Another such direction is the rotation of the grinding wheel position about an axis, which leads through the centre of a sphere (e.g., concentric with the spherical section of a ball nose mill), and includes a certain angle with the tangent to the smooth cutting edge at that point of the said smooth edge, for which the current grinding wheel position offset is determined.

(5.b) Another such direction is a linear axis, specified relative to the milling cutter geometry. Another such specific function is a length function, which determines the length by which the grinding wheel is offset in said linear direction.

(5.b.1.) One such linear direction is the direction of the circumferential tangent to the milling cutter's cutting envelope at that point of the smooth cutting edge, for which the current grinding wheel position offset is determined. One such specific length function is that length function, which evaluates by an iterative procedure according to (A)–(F) to either the positive or negative value of a fraction of a previously determined length, depending on whether an undercut or overcut was detected, respectively.

(5.b.2) Another such linear direction is the direction of that tangent to the milling cutter's cutting envelope at the cutting edge point as in 5.b.1, but which is also normal to the smooth cutting edge's tangent in the same point as stated in 5.b.1.

(6) From the set of transformed wheel positions (new_ pos_i) according to (4) (step 46 in FIG. 6), a set of machine axis positions is derived with the machine axis position processor, which in turn represent the grinding wheel's tool-path, expressed in machine axis coordinates.

(6.a) One such tool-path is the combination of the "smooth flute motion" and additional simultaneous linear and rotary motions in several or all linear and rotary axes of the grinding machine, which are determined by the offset directions, stated in step (5), by angles and lengths, which correspond to the angle and length function values, as determined in step (5).

(6.b) Another such tool-path is the simultaneous "smooth flute motion" and an additional simultaneous rotation of the tool holding axis, which is determined by the specified offset direction, and specified angles of rotation in said offset direction as stated in step (5a.1). The specified angles of rotation preferably result from evaluation of an angle function as determined in step (5a.1).

(6.c) One such tool-path is the combination of the "smooth flute motin" and additional simultaneous linear and rotary motions in several or all linear and rotary axes of the grinding machine which are determined by the specified linear and rotary offset directions and specified angles of rotation and lengths of translation in said offset directions as stated in step (5.a.2). The angles of rotation and lengths of translation preferably result from the evaluation of angle functions and length functions, as determined in step (5.a.2). Preferably, the angle and length functions are dependent on each other.

(6.d) Another such tool-path is the combination of the "smooth flute motion" and an additional simultaneous linear motion in one of the grinding machine's linear axes, which is determined by the specified offset direction, as stated in step (5.b.1), and a specified offset length of translation in said offset direction. Preferably, the length of translation results from evaluation of a length function values as determined step (5.b.1).

(6.e) Another such tool-path is the combination of the "smooth flute motion" and additional simultaneous linear motions in two of the grinding machine's linear axes, which are determined by the specified offset directions and lengths of translations in said offset directions as stated in step (5.b.2). Preferably, the lengths, of translation result from evaluation of length functions as determined in step (5.b.1).

In each of the examples above, the angle functions and length functions express the angles of rotation and the lengths of translation as functions of the grinding wheel geometry, the cutting tool geometry, the offset directions and the condition that undercut or overcut be less than a threshold value.

As used herein the term "smooth flute motion" is used to refer to the commonly known motion which is required to grind a smooth milling cutter flute on a milling cutter. By nature of the tool-path generating method as described above, the grinding wheel motion, expressed in machine axis coordinates, is a combination of the "smooth flute motion" and simultaneous additional perturbed motions in one or more physical axes and/or Soft Axes of the grinding machine.

Figure 7A:
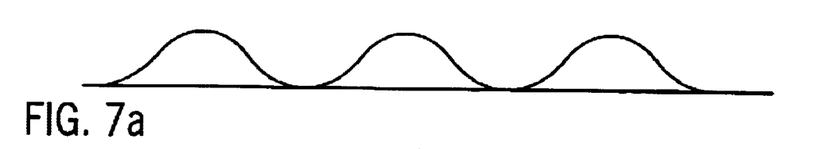
FIGS. 7a, 7b and 7c are examples of perturbations which may be applied to cutting edges formed in accordance with the invention.
Figure 7B:
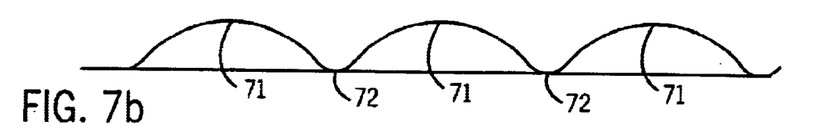

It will be appreciated that the method of the present invention may be used to grind blades with a wide variety of wavy perturbations in the cutting edge. One such perturbation is a periodic oscillation of the cutting edge about a smooth cutting edge form. Preferred types of such smooth cutting edges are those with constant helix, constant lead and constant shear geometrics. One preferred such perturbation is a symmetric sinusoidal form such as illustrated in FIG. 7a. Another preferred perturbation in accordance with the invention is a piece-wise sinusoidal oscillation. A piece-wise sinusoidal oscillation may have different wavelengths for positive and negative half waves, such as illustrated in the asymmetric sinusoidal oscillation of FIG. 7b which shows positive half waves 71 and negative half waves 72 of different wavelengths, or may consist of only positive (or negative) half waves.

Figure 7C:
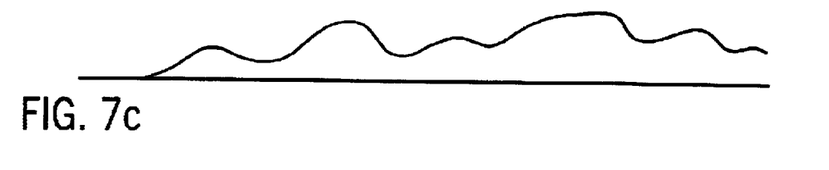

A further preferred form of perturbation is a scalloped cutting edge with part-circular scallops in the edge. It is also possible to program the machine to grind a free form wavy perturbation in the cutting edge, for instance as illustrated by FIG. 7c.

Figure 8A:
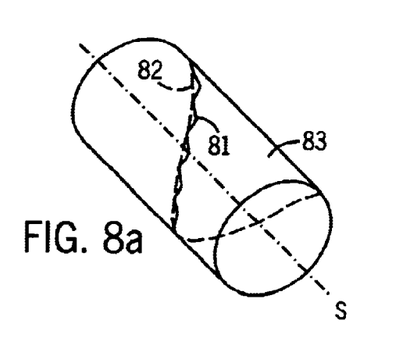
FIGS. 8a to 8d are examples of shapes of cutting tools having blades with wavy cutting-edges formed in accordance with the invention.
Figure 8B:
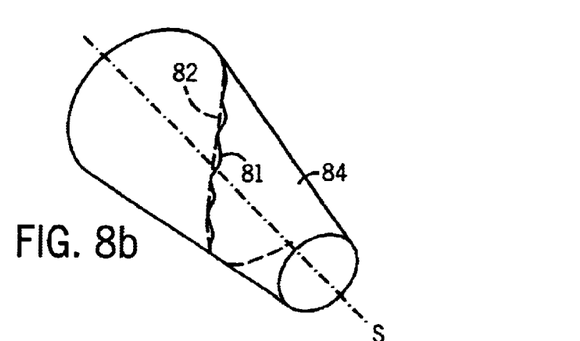
Figure 8C:
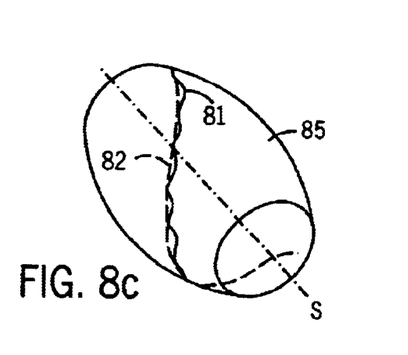
Figure 8D:
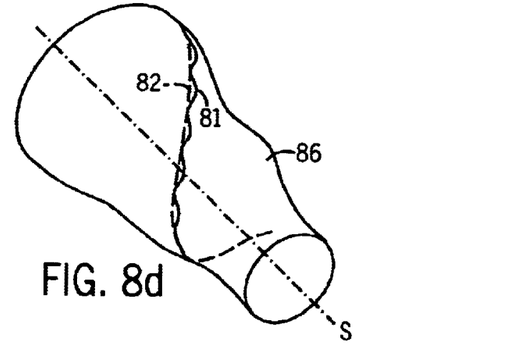

Whilst the present invention will usually be used to grind a blade with a wavy perturbation 81 in its cutting edge 82 in a cylindrical, cutting tool 83, such as illustrated in FIG. 8a, it may be used on workpieces of shapes other than cylindrical but also having a longitudinal central axis of symmetry S about which they are rotatable. For example, the CNC machine may be programmed to grind a blade with a wavy perturbation 81 in its cutting edge 82 in a conical workpiece 84 (FIG. 8b), in a toroidal workpiece 85 (FIG. 8c) or in an irregular shaped workpiece 86 (FIG. 8*d*) which only has rotational symmetry about a central longitudinal axis S.

It will also be appreciated that various modifications and alterations may be made to the preferred embodiments above, without departing from the scope and spirit of the present invention.

What is claimed is:

1. A method of operating a CNC grinding machine to grind a blade with a cutting edge of wavy configuration in a workpiece, the CNC grinding machine having at least one rotatable grinding wheel movable relative to the workpiece, said method including:

programming the CNC machine with at least one path for the at least one grinding wheel, the at least one path being calculated to grind at least one surface of a blade with a generally smooth cutting edge in the workpiece; and programming the CNC machine with perturbations to said at least one path, the perturbations varying the movement of the at least one grinding wheel in such a manner that the at least one grinding wheel is arranged to grind at least one surface of the blade with a cutting edge of a wavy configuration in the workpiece.

2. A method according to claim 1, wherein the CNC machine has a plurality of grinding wheels and is programmed with a plurality of paths for the grinding wheels for grinding surfaces of the blade with the generally smooth cutting edge, and the machine is programmed with perturbations to said plurality of paths.

3. A method according to claim 1 further including the steps of:

calculating a set of wheel positions defining the or each path for the or each grinding wheel; and calculating perturbed wheel positions which are offset from the path for the or each grinding wheel.

4. A method according to claim 3, wherein said set of wheel positions are calculated from data representing the geometry for the blade with a generally smooth cutting edge and from data representing the shape of the at least one grinding wheel and the perturbed wheel positions are calculated from said wheel positions and from data representing required perturbations for the wavy cutting edge.

5. A method according to claim 3, wherein the perturbed wheel positions are offset in at least one linear or rotary direction by definition of a specific function for offset magnitudes in said at least one direction.

6. A method according to claim 5, wherein when grinding a perturbed cutting edge, the grinding wheel is programmed, for each perturbed wheel position, to contact the workpiece at a single location of the perturbed cutting edge, while avoiding overcutting or undercutting of the cutting edge.

7. A method according to claim 1, wherein the method is used to grind a perturbed leading edge of a relief facet in a wavy cutting edge of a blade in a workpiece.

8. A method according to claim 7, wherein when grinding a perturbed leading edge of a relief facet, the grinding wheel is programmed, for each perturbed wheel position, to contact the workpiece at a single location of the perturbed leading edge while avoiding overcutting or undercutting of the leading edge.

9. A method according to claim 6, wherein overcutting or undercutting is avoided, for each perturbed wheel position, by calculating the magnitude of any distance between the perturbed wheel position and the cutting edge or leading edge in an overcut or undercut position, determining whether the magnitude is less than a threshold value and, if not, revising the perturbed wheel position until it is less than said threshold value.

10. A method according to claim 9, wherein the perturbed wheel positions are revised incrementally if said magnitude is not less than said threshold value.

11. A method according to claim 5, wherein the wheel positions are offset in a rotary direction relative to the axis of rotation of the workpiece.

12. A method according to claim 5, wherein the wheel positions are offset in a rotary direction relative to an axis which leads through the center of a sphere and includes an angle with the tangent to the smooth cutting edge at the point of the smooth cutting edge for which the current grinding wheel position is determined.

13. A method according to claim 5, wherein the wheel positions are offset in a linear direction of the circumferential tangent to a cutting envelope of the workpiece at the point of the smooth cutting edge for which the current grinding wheel position is determined.

14. A method according to claim 13, wherein the said linear direction is also normal to the tangent of the smooth cutting edge of the workpiece at the point for which the current grinding wheel position is determined.

15. A method according to claim 5, wherein a set of machine axis positions which represents a tool path for the grinding wheel expressed in machine axis co-ordinates is derived from the perturbed wheel positions.

16. A method according to claim 15, wherein the tool path is the combination of a smooth flute motion for grinding a smooth milling cutter flute on a milling cutter and at least one additional simultaneous linear and/or rotary motion in one or more linear and/or rotary axes of the grinding machine.

17. A method according to claim 16, wherein the tool path is the combination of the smooth flute motion and an additional simultaneous rotation of a tool holding axis of the machine which is determined by a specified offset direction, and specified angles of rotation in said offset direction.

18. A method according to claim 17, wherein the specified angles of rotation result from evaluation of an angle function.

19. A method according to claim 18, wherein the angle function expresses the angles of rotation as a function of the given wheel geometry, the cutting tool geometry, the offset direction and a condition that undercut or overcut be less than a threshold.

20. A method according to claim 16, wherein the tool path is the combination of the smooth flute motion and a plurality of additional simultaneous linear and rotary motions in a plurality of linear and rotary axes which are determined by specified linear and rotary offset directions and specified angles of rotation and lengths of translation in said offset directions.

21. A method according to claim 20 wherein the angles of rotation result from the evaluation of angle functions and the lengths of translation result from the evaluation of length functions.

22. A method according to claim 21 wherein the angle and length functions express the angels of rotations and lengths of translations as functions of the given wheel geometry, the cutting tool geometry, the offset directions and a condition that undercut or overcut be less than a threshold.

23. A method according to claim 28 wherein the angle and length functions are dependent on each other.

24. A method according to claim 16, wherein the tool path is the combination of the smooth flute motion and an additional simultaneous linear motion in one of the linear axes of the grinding machine, which is determined by a specified offset direction and a specified length of translation in said offset direction.

25. A method according to claim 24 wherein the length of translation results from the evaluation of a length function.

26. A method according to claim 25 wherein the length function expresses the length of translation as a function of the given wheel geometry, the cutting tool geometry, the offset direction and a condition that undercut or overcut be less than a threshold.

27. A method according to claim 16, wherein the tool path is the combination of the smooth flute motion and additional simultaneous linear motions in two of the linear axes of the grinding machine, which are determined by specified offset directions, and lengths of translations in said offset directions.

28. A method according to claim 27, wherein the lengths of translations result from the evaluation of lengths functions.

29. A method according to claim 28 wherein the length functions express the lengths of translation as functions of the given wheel geometry, the cutting tool geometry, the offset directions and a condition that undercut or overcut be less than a threshold.

30. A method according to claim 28 wherein the length functions are dependent on each other.

31. A CNC grinding machine having at least one rotatable grinding wheel movable relative to a workpiece for grinding at least one blade in the workpiece, the machine being programmed with at least one path for the at least one grinding wheel which is calculated to grind at least one surface of a blade with a generally smooth cutting edge, wherein the machine is programmed with perturbations to said at least one path, the perturbations varying the movement of the at least one grinding wheel from said at least one path in such a manner that the at least one grinding wheel grinds a blade with a cutting edge of wavy configuration in the workpiece.

32. A machine according to claim 31 which includes programmable means for receiving data representing the geometry for the blade with a generally smooth cutting edge, data representing the shape of the at least one grinding wheel, and data representing required perturbations for the wavy cutting edge.

33. A machine according to claim 32 which includes:
a wheel position generator for generating a set of wheel positions defining the path for the at least one grinding wheel; and
wheel position adjustment means for calculating perturbed wheel positions for the at least one grinding wheel which are offset from the path.

34. A machine according to claim 33, wherein the set of wheel positions defining the path is generated from data representing the geometry for the blade with a generally smooth cutting edge and said data representing the shape of said at least one grinding wheel.

35. A machine according to claim 34, wherein the wheel position adjustment means calculates the perturbed wheel positions from the set of wheel positions defining the path and from the data representing the required perturbations for the wavy cutting edge.

36. A machine according to claim 33, wherein the wheel position adjustment means is programmed to avoid overcut or undercut by calculating the magnitude of any distance between the perturbed wheel position and the cutting edge, determining whether the magnitude is less than a threshold value, and if not, revising the perturbed wheel position until it is less than said threshold value.

37. A machine according to claim 33, wherein the wheel positions are offset in at least a linear direction.

38. A machine according to claim 33, wherein the wheel positions are offset in at least a rotary direction.

39. A machine according to claim 33 further including a machine axis position processor adapted to derive a set of machine axis positions from the perturbed wheel positions.

40. A milling cutting tool having at least one blade with a wavy cutting edge forming a defined cutting envelope and produced by the method of claim 1.

41. A tool according to claim 40, wherein the perturbations to the generally smooth cutting edge are symmetrical sinusoidal perturbations.

42. A tool according to claim 40, wherein the perturbations to the generally smooth cutting edge are asymmetric or piece-wise sinusoidal perturbations.

43. A tool according to claim 42, wherein alternate perturbations have different wavelengths.

44. A tool according to claim 40, wherein the perturbations to the generally smooth cutting edge are circular scallops.

45. A cutting tool according to claim 40, wherein the perturbations are free-form wavy perturbations.

46. A cutting tool according to claim 40, wherein the cutting tool has a central longitudinal axis of rotational symmetry.

47. A cutting tool according to claim 46, wherein the cutting tool is substantially cylindrical with at least one helical flute.

48. A cutting tool according to claim 46, wherein the cutting tool is generally conical or frusto-conical with at least one helical flute.

49. A cutting tool according to claim 46, wherein the cutting tool is generally toroidal in shape with at least one helical flute.

50. A computer program for use with a CNC tool grinding machine having at least one rotatable grinding wheel movable relative to a workpiece for grinding a blade with a cutting edge of wavy configuration in the workpiece, the computer program comprising:
path generating means to generate at least one path for said at least one grinding wheel, said at least one path being calculated to grind at least one surface of the blade with a generally smooth cutting edge in the workpiece; and
path adjustment means which calculates perturbations to said at least one path, the perturbations being arranged to vary the movement of the at least one grinding wheel in such a manner that the at least one grinding wheel grinds at least one surface of the blade with a cutting edge of a wavy configuration.

51. A computer program according to claim 50, wherein the path generating means is arranged to generate a set of wheel position defining said path for said at least one grinding wheel, and the path adjustment means calculates perturbed wheel positions for the at least one grinding wheel which are offset from said path.

52. A computer program according to claim 51, wherein the set of wheel positions defining said path is generated from data representing geometry for the blade with a generally smooth cutting edge and data representing the shape of said at least one grinding wheel, and the path adjustment means calculations the perturbed wheel positions from the set of wheel positions defining said path and from data representing the perturbations for the wavy cutting edge.

53. A computer program according to claim 51, wherein the perturbed wheel positions are offset in at least one linear or rotary direction by definition of a specific function for offset magnitudes in said at least one direction.

54. A computer program according to claim 51, wherein the path adjustment means is arranged to calculate the magnitude of any distance between the perturbed wheel position and the cutting edge, and to determine whether the magnitude is less than a threshold value, and if not, to revise the perturbed wheel position until said magnitude is less than said threshold value.

55. A computer program according to claim 54, wherein the perturbed wheel positions are revised incrementally when said magnitude is not less than said threshold value.

56. A computer program according to claim 50 which is recorded on a memory or data storage medium.

* * * * *